(12) United States Patent
Bookman et al.

(10) Patent No.: US 11,418,336 B2
(45) Date of Patent: Aug. 16, 2022

(54) DIGITAL LEDGER FOR UNIQUE ITEM IDS WITH OWNERSHIP

(71) Applicant: Google LLC, Mountain View, CA (US)

(72) Inventors: Colin Bookman, Mountain View, CA (US); Ryan Krebs, New York, NY (US)

(73) Assignee: Google LLC, Mountain View, CA (US)

( * ) Notice: Subject to any disclaimer, the term of this patent is extended or adjusted under 35 U.S.C. 154(b) by 284 days.

(21) Appl. No.: 16/447,019

(22) Filed: Jun. 20, 2019

(65) Prior Publication Data

US 2019/0394026 A1    Dec. 26, 2019

Related U.S. Application Data

(60) Provisional application No. 62/687,570, filed on Jun. 20, 2018.

(51) Int. Cl.
*H04L 9/08* (2006.01)
*G06K 19/06* (2006.01)
(Continued)

(52) U.S. Cl.
CPC ........ *H04L 9/088* (2013.01); *G06K 19/06028* (2013.01); *H04L 9/30* (2013.01); *H04L 9/3247* (2013.01)

(58) Field of Classification Search
CPC ......... H04L 9/088; H04L 9/30; H04L 9/3247; H04L 9/3297; H04L 9/3239;
(Continued)

(56) References Cited

U.S. PATENT DOCUMENTS

| 6,901,304 B2 * | 5/2005 | Swan | G06Q 10/087 |
| | | | 700/115 |
| 8,417,592 B1 * | 4/2013 | Kumar | G06Q 10/087 |
| | | | 705/28 |

(Continued)

FOREIGN PATENT DOCUMENTS

| KR | 2019134296 A | * 12/2019 | ......... G06Q 10/0833 |
| WO | WO-2016161483 A1 | * 10/2016 | ....... G06Q 10/06315 |

OTHER PUBLICATIONS

International Search Report and Written Opinio for International Application No. PCT/US2019/038240 dated Aug. 2, 2019. 15 pages.

(Continued)

*Primary Examiner* — Shahriar Zarrineh
(74) *Attorney, Agent, or Firm* — Lerner, David, Littenberg, Krumholz & Mentlik, LLP

(57) ABSTRACT

A system and method for recording, authenticating and verifying transactions of physical items between transacting parties. The system may include memory storing a digital ledger comprising a list of identifiers for a plurality of physical items, each physical item corresponding to a different respective identifier, each identifier being linked in the digital ledger to a public key of an owner of the corresponding physical item, and the list of identifiers and linked public keys being distributed among a plurality of blocks sequentially connected to one another in the digital ledger. The system may also include one or more processors configured to receive a cryptographically signed message including information regarding a transaction of a physical item, including the corresponding identifier of the physical item derived from scanning a label affixed to the physical. The system may verify the message and incorporate the information regarding the transaction into the digital ledger.

13 Claims, 6 Drawing Sheets

(51) Int. Cl.
   *H04L 9/30* (2006.01)
   *H04L 9/32* (2006.01)
(58) Field of Classification Search
   CPC ... H04L 63/126; H04L 63/08; H04L 2209/38;
   G06K 19/06028; G06Q 10/087; G06Q 30/018
   USPC .......................................................... 713/171
   See application file for complete search history.

(56) References Cited

U.S. PATENT DOCUMENTS

| | | | | |
|---|---|---|---|---|
| 8,756,124 | B1* | 6/2014 | Sayers, III | G06Q 30/0185 705/28 |
| 10,002,362 | B1* | 6/2018 | Endress | G09C 1/00 |
| 10,755,226 | B1* | 8/2020 | Robyak | G06K 7/10366 |
| 2003/0158795 | A1* | 8/2003 | Markham | G06Q 10/06 705/28 |
| 2003/0236768 | A1* | 12/2003 | Sribhibhadh | G06Q 10/087 |
| 2005/0075900 | A1* | 4/2005 | Arguimbau | G06Q 10/0637 426/87 |
| 2009/0008450 | A1* | 1/2009 | Ebert | G07C 9/28 235/439 |
| 2010/0090005 | A1* | 4/2010 | Silverbrook | G06Q 20/401 235/385 |
| 2012/0319815 | A1* | 12/2012 | Feldman | G01S 5/04 340/5.8 |
| 2015/0269570 | A1* | 9/2015 | Phan | G06Q 20/382 705/71 |
| 2016/0098723 | A1 | 4/2016 | Feeney | |
| 2016/0098730 | A1* | 4/2016 | Feeney | G06Q 20/3825 705/71 |
| 2016/0253622 | A1* | 9/2016 | Sriram | H04L 63/126 713/179 |
| 2016/0283920 | A1* | 9/2016 | Fisher | H04L 9/3297 |
| 2016/0342959 | A1 | 11/2016 | Thomas et al. | |
| 2017/0032382 | A1* | 2/2017 | Shulman | G06Q 30/0185 |
| 2017/0046709 | A1* | 2/2017 | Lee | G06Q 10/08 |
| 2017/0046806 | A1* | 2/2017 | Haldenby | G06Q 10/08 |
| 2017/0048216 | A1* | 2/2017 | Chow | G06Q 20/367 |
| 2017/0083860 | A1* | 3/2017 | Sriram | H04L 63/0823 |
| 2017/0213059 | A1* | 7/2017 | Koch | G06K 7/10386 |
| 2017/0243193 | A1* | 8/2017 | Manian | G06Q 20/3829 |
| 2017/0243241 | A1* | 8/2017 | Boutelle | H04L 9/3236 |
| 2017/0262862 | A1* | 9/2017 | Aljawhari | G06F 16/90335 |
| 2017/0300905 | A1* | 10/2017 | Withrow | G06Q 20/401 |
| 2017/0331896 | A1* | 11/2017 | Holloway | H04L 67/04 |
| 2018/0101842 | A1* | 4/2018 | Ventura | H04L 9/0841 |
| 2018/0108024 | A1* | 4/2018 | Greco | H04L 9/0637 |
| 2018/0130034 | A1* | 5/2018 | Taylor | H04L 9/3247 |
| 2018/0130050 | A1* | 5/2018 | Taylor | H04L 9/3247 |
| 2018/0131765 | A1* | 5/2018 | Puleston | G06F 16/907 |
| 2018/0137512 | A1* | 5/2018 | Georgiadis | H04L 9/3239 |
| 2018/0174097 | A1* | 6/2018 | Liu | H04L 9/3239 |
| 2018/0232731 | A1* | 8/2018 | Liu | H04L 9/3247 |
| 2018/0276600 | A1* | 9/2018 | Fuller | G06K 7/12 |
| 2018/0285810 | A1* | 10/2018 | Ramachandran | G06Q 30/04 |
| 2018/0330342 | A1* | 11/2018 | Prakash | G06Q 20/065 |
| 2018/0349968 | A1* | 12/2018 | O'Brien | H04L 9/3297 |
| 2019/0019183 | A1* | 1/2019 | Karame | G06Q 20/3829 |
| 2019/0026685 | A1* | 1/2019 | Chappell | G06Q 30/0631 |
| 2019/0114584 | A1* | 4/2019 | Toohey | G06K 19/07758 |
| 2019/0188706 | A1* | 6/2019 | McCurtis | G06Q 20/02 |
| 2019/0306230 | A1* | 10/2019 | Purushothaman | H04L 67/104 |
| 2020/0366469 | A1* | 11/2020 | John | H04L 9/3073 |
| 2020/0394652 | A1* | 12/2020 | Youb | G06Q 30/0645 |
| 2021/0248653 | A1* | 8/2021 | McKenzie | G06F 21/44 |

OTHER PUBLICATIONS

International Preliminary Report on Patentability for International Application No. PCT/US2019/038240 dated Dec. 30, 2020. 10 pages.

* cited by examiner

Message to Miners

| Unique ID | product_123456 |
|---|---|
| Seller Public Key | ------ BEGIN RSA PUBLIC KEY ------<br>------ END RSA PUBLIC KEY ------ |
| Buyer Public Key | ------ BEGIN RSA PUBLIC KEY ------<br>------ END RSA PUBLIC KEY ------ |
| Timestamp | 2018-04-20 11:02:30 UTC |
| Digital Signature | RSA_sign(Unique ID / Buyer / Timestamp , Seller Private Key) |

DIGITAL LEDGER FOR UNIQUE ITEM IDS WITH OWNERSHIP

CROSS-REFERENCE TO RELATED APPLICATIONS

This application claims the benefit of the filing date of U.S. Provisional Patent Application No. 62/687,570 filed Jun. 20, 2018, the disclosure of which is hereby incorporated herein by reference.

BACKGROUND OF THE INVENTION

In modern day commerce, almost any physical product is likely to have some label corresponding to an identification (ID) code scheme, such as barcodes, vehicle identification numbers (VINs), international standard book numbers (ISBNs), etc. With the plethora of ID code schemes arises a problem—there is no common thread between the various schemes and each industry may have its own non-unique ID code scheme.

The number of labels afforded by current ID code schemes may be limited. As a result, labels may be reused, which may lead to irregularities in tracking systems, such as conflicts between different products having the same label. Additionally, many ID code schemes are used to track products at the stock keeping unit (SKU) level instead of the individual items themselves. SKUs identify items by their type, so the same SKU number is used for every item of a given type. Reusing labels at the SKU level may also lead to irregularities in the tracking systems and may not allow for specific items to be tracked.

Furthermore, the label featured on a physical product does not guarantee the product's authenticity. The lack of ownership of labels, and the possibility of the same labels being used on many products may lead to counterfeits, unsafe products, and an opaque supply chain. For example, a counterfeiter can print a label, such as a GTIN14 barcode on a box, a VIN number on a car, or Hull IDs (HID) on a boat and represent the product as genuine. Furthermore, anyone can claim that they scanned a label, even if the item is no longer in their possession. This could enable a seller to fraudulently attempt to sell the same item multiple times, thus creating a sort of "double spend problem."

BRIEF SUMMARY OF THE INVENTION

One aspect of the present disclosure is directed to a system including memory storing a digital ledger including a list of identifiers for a plurality of physical items. Each physical item may correspond to a different respective identifier. Each identifier may be linked in the digital ledger to a public key of an owner of the corresponding physical item. The list of identifiers and linked public keys may be distributed among a plurality of blocks sequentially connected to one another in the digital ledger. The system may further include one or more processors configured to receive a message indicating a transaction of a physical item from a first user to a second user, verify authenticity of the message, and upon verifying the authenticity of the message, incorporate the information regarding the transaction in the digital ledger. The message may be cryptographically signed by a private key of the first user and may include information regarding the transaction and the corresponding identifier of the physical item derived from scanning a label affixed to the physical item.

In some examples, the one or more processors may be further configured to receive a query regarding a physical item, the query including the corresponding identifier of the physical item derived from scanning the label affixed to the physical item and a public key of a queried user, and in response to the query, determine from the digital ledger whether or not the queried user is owner of the physical item and transmit a confirmation whether or not the queried user is owner of the physical item.

In some examples, to verify authenticity of the message, the one or more processors may be configured to verify a cryptographic signature of the first user using a public key of the first user, and verify that the physical item either is new or is owned by the first user.

In some examples, to verify that the physical item is new, the one or more processors may be configured to determine from the digital ledger whether or not the corresponding identifier of the physical item is included in the digital ledger. If the corresponding identifier of the physical item is not included in the digital ledger, then the physical item may be determined to be new. Additionally, or alternatively, if the physical item is included in the digital ledger, the one or more processors are configured may determine whether the public key linked to the identifier in the digital ledger matches the public key of the first user. If the public key linked to the identifier in the digital ledger matches the public key of the first user, then the physical item may be determined to be owned by the first user.

In some examples, the information regarding the transaction may include a public key of the second user. To include the message in the digital ledger, the one or more processors may be configured to link the corresponding identifier of the physical item to the public key of the second user.

In some examples, the information regarding the transaction may further include a timestamp indicating a time of the transaction.

In some examples, the digital ledger may be stored among a plurality of peer nodes in a distributed network. To include the message in the digital ledger, the one or more processors may be configured to broadcast the message to peer nodes of the distributed network.

In some examples, the label affixed to the physical item may be a bar code.

In some examples, the memory and the one or more processors may be communicatively coupled over a distributed computing network.

Another aspect of the present disclosure is directed to a method of authenticating and recording a transaction by one or more processors, including: receiving a message indicating a transaction of a physical item from a first user to a second user, verifying authenticity of the message; and upon verifying the authenticity of the message, recording the transaction in a digital ledger. The message may be cryptographically signed by a private key of the first user and may include information regarding the transaction and an identifier corresponding to the physical item. The identifier may be derived from scanning a label affixed to the physical item. The digital ledger may include a list of identifiers for a plurality of physical items, each physical item corresponding to a different respective identifier. The list of identifiers may be included in a plurality of blocks sequentially connected to one another in the digital ledger. Upon verifying the authenticity of the message, the identifier corresponding to the physical item may be linked, by the one or more processors, in the digital ledger to a public key of the second user.

In some examples, verifying authenticity of the message may involve verifying, by the one or more processors, a cryptographic signature of the first user using a public key of the first user, and verifying, by the one or more processors, that the physical item either is new or is owned by the first user. Verifying that the physical item is new may involve determining from the digital ledger whether the identifier of the physical item is included in the digital ledger. If the corresponding identifier of the physical item is not included in the digital ledger, then the physical item may be determined to be new. Additionally or alternatively, the method may further involve, upon determining that the physical item is included in the digital ledger, determining, by the one or more processors, whether the public key linked to the identifier in the digital ledger matches the public key of the first user. If the public key linked to the identifier in the digital ledger matches the public key of the first user, then the physical item may be determined to be owned by the first user.

In some examples, the information regarding the transaction may include a public key of the second user. Recording the transaction in the digital ledger may involve linking, by the one or more processors, the corresponding identifier of the physical item to the public key of the second user in the digital ledger.

In some examples, the information regarding the transaction received in the message may further include a timestamp indicating a time of the transaction.

In some examples, the digital ledger may be stored among a plurality of peer nodes in a distributed network. Recording the transaction in the digital ledger may involve broadcasting, by the one or more processors, the message to peer nodes of the distributed network.

In some examples, receiving the message and recording the transaction in the digital ledger may be performed among a plurality of processors over a distributed computing network.

Yet another aspect of the present disclosure is directed to a method for verifying authenticity and ownership of a physical item using a digital ledger including a list of identifiers for a plurality of physical items. Each physical item may correspond to a different respective identifier, each identifier may be linked in the digital ledger to a public key of an owner of the corresponding physical item, and the list of identifiers and linked public keys may be distributed among a plurality of blocks sequentially connected to one another in the digital ledger. The method may involve receiving, by one or more processors, a query regarding the physical item, the query including the corresponding identifier of the physical item derived from scanning a label affixed to the physical item, and a public key of a purported owner of the physical item, and in response to the query, determining, by the one or more processors, whether the public key is currently linked to the corresponding identifier of the physical item in the digital ledger. If the public key is currently linked to the corresponding identifier of the physical item, the method may further involve transmitting, by the one or more processors, a message confirming that the physical item is authentic and is owned by the purported owner.

In some examples, if the public key is not currently linked to the corresponding identifier of the physical item, then the method may further involve transmitting, by the one or more processors, a message indicating that the physical item is not owned by the purported owner.

In some examples, if the corresponding identifier of the physical item is not present in the digital ledger, then the method may further involve transmitting, by the one or more processors, a message indicating that the physical item is not authentic.

Yet a further aspect of the present disclosure is directed to a method for verifying ownership of a physical item. The method may involve transmitting, by one or more processors, a message over a network to a distributed database. The message may include the identifier unique to the physical item and derived from scanning a label affixed to the physical item, and an indication of a purported owner of the physical item. The distributed database may include a digital ledger comprising identifiers for a plurality of respective physical items. Each identifier may be linked in the digital ledger to a public key of an owner of the corresponding physical item. The identifiers and linked public keys may be distributed among a plurality of blocks sequentially connected to one another in the digital ledger. The method may further involve, upon determining that the public key of the purported owner is linked to the identifier of the physical item in the digital ledger, receiving, by the one or more processors, a reply over the network verifying ownership of the physical item.

In some examples, the message may be transmitted using a remote procedure call.

In some examples, scanning the label affixed to the physical item is performed using a scanning device connectable to the network.

BRIEF DESCRIPTION OF THE DRAWINGS

FIG. 2 is a diagram illustrating an example message according to aspects of the disclosure.

DETAILED DESCRIPTION

Overview

The technology relates generally to recording and authenticating transactions of physical items. The physical items are labelled with scannable labels, each label containing therein a unique identifier corresponding to the physical item to which that label is affixed. The scannable label may be scanned at every transaction to log the transactions as they occur. For instance, the two transacting parties may scan the label in order to record a transaction between the parties. For further instance, a party interested in conducting a transaction may scan the label in order to query information about the physical item, such as whether it is authentic or whether the purported seller of the item is recorded as the item's current owner.

A digital ledger, also referred to as a "blockchain," may record information about ownership of physical items, such as items for sale labeled with a label including identification information unique to the specific item. The identification information may then be used to log transactions of the item in the digital ledger. A customer can query the digital ledger to confirm the origin of the item, as well as the current owner of the item. By doing such, the customer can evaluate whether the item is genuine or a counterfeit and whether the item belongs to the seller. In the present technology, the ID code scheme assigns a unique identifier to every item. This enables the digital ledger to keep accurate records on an item-by-item basis. Furthermore, because the identifiers are added to the ledger using a cryptographic hash, the identifiers may be digitized into any length of any combination of characters, making the system compatible with preexisting product serial numbering schemes.

Example Systems

Figure 1A:
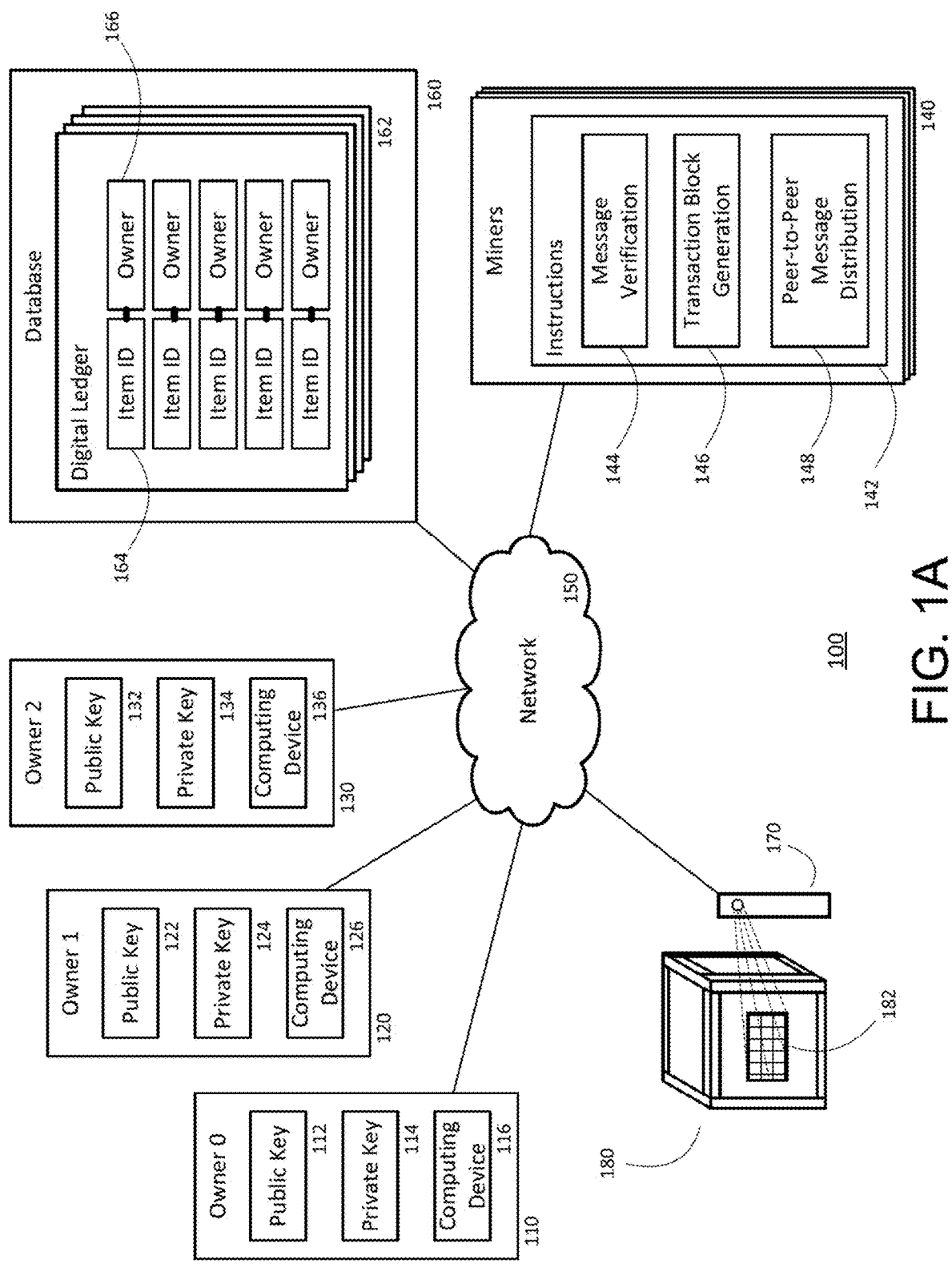
FIG. 1A is a block diagram illustrating an example system according to aspects of the disclosure.

FIG. 1A is a block diagram illustrating an example system 100. The system 100 may include data belonging to plurality of users, such as Owner 0 (110), Owner 1 (120), and Owner 2 (130). The users may be individuals or entities that transact physical items with one another. For example, one user may be a manufacturer of a product, another user may be a distributor of the product, another user may be a storekeeper that sells the product to customers, and another user may be a customer.

Each user 110, 120, 130 may be associated with its own public key 112, 122, 132 and/or its own private key 114, 124, 134. The private keys may be used to cryptographically sign information to be added to the ledger, and the public key may be used to check the signed messages as well as to query information in the public ledger. In some instances, users may have more than one public and/or private key.

Each user may also be associated with a client computing device, e.g., laptop, tablet, mobile phone, smartwatch, desktop PC, may communicate content or other information via a communication system, such as network 150. However, other types of client devices may also be employed. Any such client device may send messages and query, and receive messages and query results as discussed herein.

In the example of FIG. 1A, each user is represented by a separate block corresponding to data and a client computing device 116, 1126, and 136 of the respective user. The data represented by these blocks may be stored in the respective computing devices. Alternative or additionally, the data may be stored apart from the computing devices, such as on one or more remote storage devices and/or servers in a distributed network, and so on.

Figure 1B:
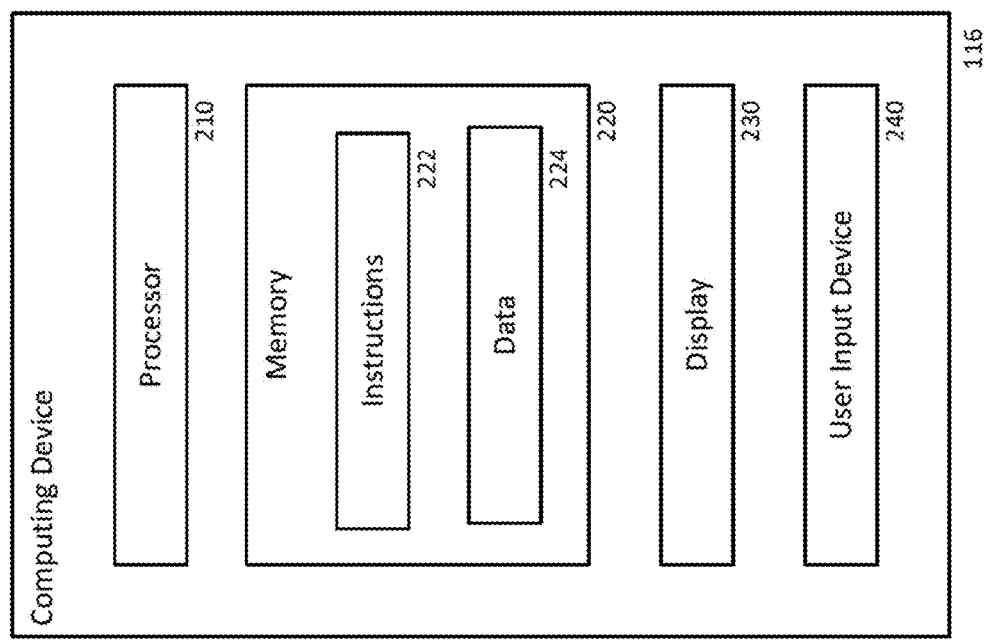
FIG. 1B is a block diagram illustrating an example computing device of the system of FIG. 1A according to aspects of the disclosure.

FIG. 1B is a block diagram of the computing device 116 of FIG. 1A. The other computing devices 126, 136 shown in FIG. 1A may be arranged similarly and may include similar or the same components. Additionally, it should be understood that the computing device 116 is not limited to including the components shown in FIG. 1B, as the computing device may include more (or fewer) components.

As shown in FIG. 1B, each client computing device 116, 126, and 136 may contain one or more processors 210, memory 220 and other components typically present in general purpose computing devices. Memory 220 of each of computing devices 116, 126, and 136 can store information accessible by the one or more processors 116, 126, and 136, including instructions that can be executed by the one or more processors 116, 126, and 136. Each client computing device may also include a display such as displays 230, such as a monitor having a screen, a touch-screen, a projector, a television, or other device that is operable to display information, a user input device 240, such as a mouse, keyboard, touch-screen, or microphone.

The one or more processors 116, 126, and 136 can be any conventional processors, such as a commercially available CPU. Alternatively, the processors can be dedicated components such as an application specific integrated circuit ("ASIC") or other hardware-based processor. Although not necessary, one or more of computing devices 116, 126, and 136 may include specialized hardware components to perform specific computing processes, such as decoding video and parallel processing, etc. faster or more efficiently.

Memory 220 can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 222 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 224 may be retrieved, stored or modified by the one or more processors 116, 126, and 136 in accordance with the instructions 222. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although FIG. 1 functionally illustrates the processor 210, memory 220, and other elements of computing device 116, 126, and 136 as being within the same block, the processor, computer, computing device, or memory can actually comprise multiple processors, computers, computing devices, or memories that may or may not be stored within the same physical housing. For example, the memory 220 can be a hard drive or other storage media located in housings different from that of the computing devices 116, 126, and 136. Accordingly, references to a processor, computer, computing device, or memory will be understood to include references to a collection of processors, computers, computing devices, or memories that may or may not operate in parallel. For example, the computing devices 116, 126, and 1236 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

The system 100 may also include one or more miners 140 tasked with executing instructions 142. Each of the miners may be configured similarly to the server computing devices 116, 126, and 136, with one or more processors, memory and instructions as described above.

The instructions 142 may be executed to perform such tasks as receiving and verifying the signed messages from the corresponding computing devices 116, 126, 136 of the users 110, 120, 130 (message verification 144), storing verified messages in the digital ledger (transaction block generation 146), and distributing the stored information to other miners (peer-to-peer message distribution 148). The miners 140 may operate one or more processors in order to execute the above-noted tasks.

The miners 140 may receive the signed messages from the corresponding computing devices 116, 126, 136 of the respective users 110, 120, 130 via a communications network 150. Typically, the message may indicate a transaction of a physical item. An example signed message is shown in FIG. 2. The message 200 may include a unique identification, such as product 123456, associated with the physical item, a public key of a first user, such as the Seller Public Key belong to the seller of the physical item, a public key of a second user, such as the Buyer Public key belonging to the buyer of the item), a timestamp indicating a time of the change of ownership of the item, and a digital signature. The digital signature may be generated using a cryptography-based signing algorithm, such as RSA_sign( ). For example, the digital signature may be generated using a hash to which the unique identification of the physical item is provided as an input and signed with the first user's private key. Verifying the message would then involve decoding the signed message with the first user's public key. In other examples, one or both of the second user's public key and the timestamp may further be included as an input to the signing algorithm.

Returning to FIG. 1A, message verification 142 may further involve comparing the details of the transaction with information stored in the digital ledger. For example, the digital ledger may indicate a current owner of the physical item, and if the current owner in the digital ledger does not match of the owner indicated in the message, it may be determined that the transaction is fraudulent or unauthorized. Message verification is described in greater detail below in connection with FIG. 5.

If the message is verified, then transaction block generation 144 may involve the miner including the transaction indicated in the message within a block of the digital ledger. The digital ledger may be included in a database 160 connected to the miners 140 via the same or a different communications network 150. The database 160 may be included in one or more servers interconnected via the network 150. While a single database is shown, the functionality of the service may be performed by one or more server devices or other computer systems, such as a cloud computing network.

Additionally, the database 160 may include one or more memory storage devices on which the digital ledger 162 is stored. The digital ledger 162 may include a list of item identifiers 164, whereby each physical item recorded in the digital ledger 162 may correspond to a different respective item identifier. Each item identifier 164 may further be linked in the digital ledger 162 to a public key of an owner 166 of the corresponding physical item. The list of item identifiers 164 and linked public keys 166 may distributed among a plurality of blocks that are sequentially connected to one another in the digital ledger. The blocks may be linked using blockchain methods known in the art.

In the example of FIG. 1A, the miners 140 and database 160 are shown as separate blocks. However, in some examples, the miners 140 may be thought of as representative of one or more processors for executing instructions, and the database may be thought of as one or more storage devices for storing the data described herein. In some examples, the miners 140 can include the same components as the database and the computing devices and data of the users 110, 120, 130. The processors and storage devices may be distributed together or separately over the communications network 150 in any manner known in the art. The devices may communicate with one another and other remote devices via the network 150 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In some examples, storage of the digital ledger 162 may be decentralized and distributed among multiple nodes of the network, such as nodes of the miners 140. Thus, the digital ledger 162 may be thought of as a distributed ledger.

The database 160 may also be accessible to the users 110, 120, 130 in order to verify whether an item that a user wishes to acquire is authentic. In this manner, the user may look up the physical item in the database using known lookup methods for digital ledgers. For example, the user may issue a remote procedure call, such as a gRPC, to query data stored in the database 160. The lookup procedure is comparable to known methods using for peer-to-peer file sharing systems and cryptocurrency transaction verification systems. The query may include the unique identifier of the physical item as well as the public key of another user who is selling the physical item and purported to be the owner of the physical item. In response to the query, the database may return a message to the user verifying whether or not the physical item belongs to the purported seller. For instance, if the item has already been sold to a different user, the database may indicate that the other user is now the owner, and thus the item no longer belongs to the purported owner. For further instance, the user may query include the unique identifier and a public key of a purported prior owner of the physical item, such as the manufacturer or distributer. Then if the item is determined to have never belonged to the purported prior owner, it may be determined that the item is counterfeit.

The system 100 may further include a scanning device 170 connectable to the communications network 150 directly and/or through one or more computing devices. The scanning device may be any device capable of reading a label from a physical product, such as a barcode reader, RF code reader, camera, etc. In the example of FIG. 1A, a physical item 180, such a box or crate, is shown and includes a scannable label 182 having an identifier unique to the physical item. In other words, even if the multiples of the same item are manufactured, each separate item is associated with a unique identification code. In this manner, records for transactions of products may be organized on an item-by-item basis.

The scanning device may scan the label 182 and provide information from the scanned label 182 over the network 150. That information may be used as, or used to derive, the unique identifier of the physical item. Because the label 182 is unique, only the one physical item bearing that label may be scanned in order to yield the unique identifier. In this manner, whenever a transaction of the physical item 180 takes place, the physical item 180 may be physically scanned in order to generate the unique identification information included in the message 200.

Example Methods

Figure 3:
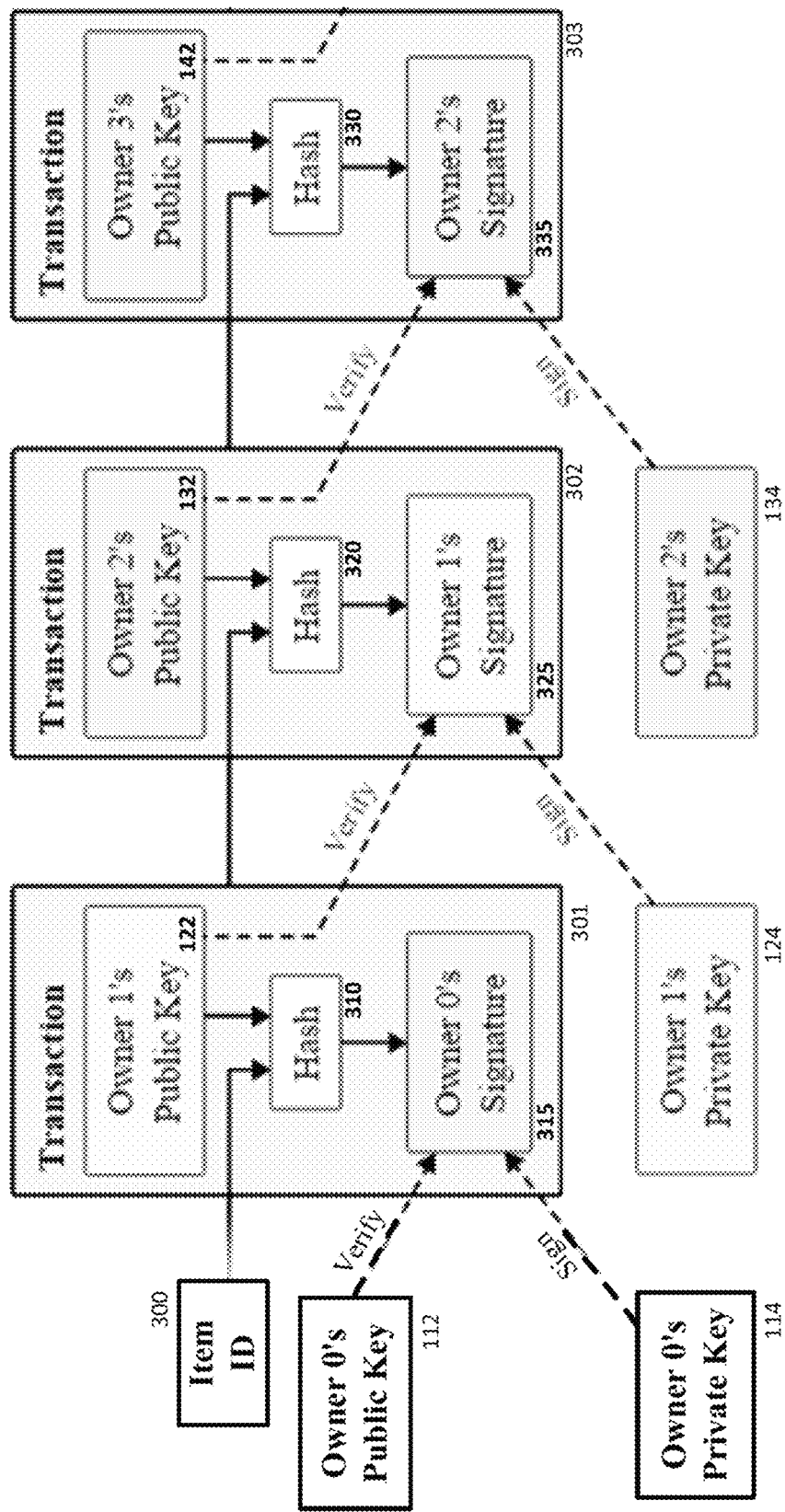
FIG. 3 is a block diagram illustrating an example use of a system according to aspects of the disclosure.

FIG. 3 illustrates a number of example transactions 301, 302, 303 between users of the system 100 of FIG. 1A that may be stored in the transactions 142 of the database 140. Each transaction 301, 302, 303 involves a physical item, such as item 170 of FIG. 1A, having an identifier 300 unique to the physical item. For example, the first transaction 301 from a first user, Owner 0, to a second user, Owner 1, may be a transaction from a manufacturer of the physical item to a distributor of the physical item, the second transaction 302 from Owner 1 to a third user, Owner 2, may be a transaction from the distributor to a storekeeper, and the third transaction from Owner 2 to a fourth user, Owner 3, may be a transaction from the storekeeper to a customer. Other transactions and other transaction parties may be users of the system, and the system may be used to record transactions among many types of parties, including manufactures, shippers, distributors, storekeepers, contractors, and customers or end-users.

In the example of FIG. 3, the first transaction 301 may be recorded in a digital message including the unique identifier 300 of the physical item and Owner 1's public key 122, and further cryptographically signed using Owner 0's private encryption key 114. In particular, a checksum or hash 310 may be generated based on the unique identifier 300 and Owner 1's public key 122, and Owner 0's private key 114 may then be applied to the hash to "sign" it such that the hash may be properly decoded only with Owner 0's public key 112. Signing the message may be accomplished using executable code which performs a cryptographic process on the component, whereby the checksum may be unique and cryptographically secure to prevent tampering. Any number of cryptographic algorithms or hashing functions may be used by the verification application to achieve these goals. For instance, the SHA-2 family of hash functions—including but not limited to SHA-256—may be used. In this regard, the public key 112 may be stored publically so that it may be accessed in order to decode the message. The checksum derived from applying the public key may then be compared to a checksum generated by a verification application in order to confirm that the message has not been altered since the time it was signed by Owner 0 with the private key 114.

Figure 4:
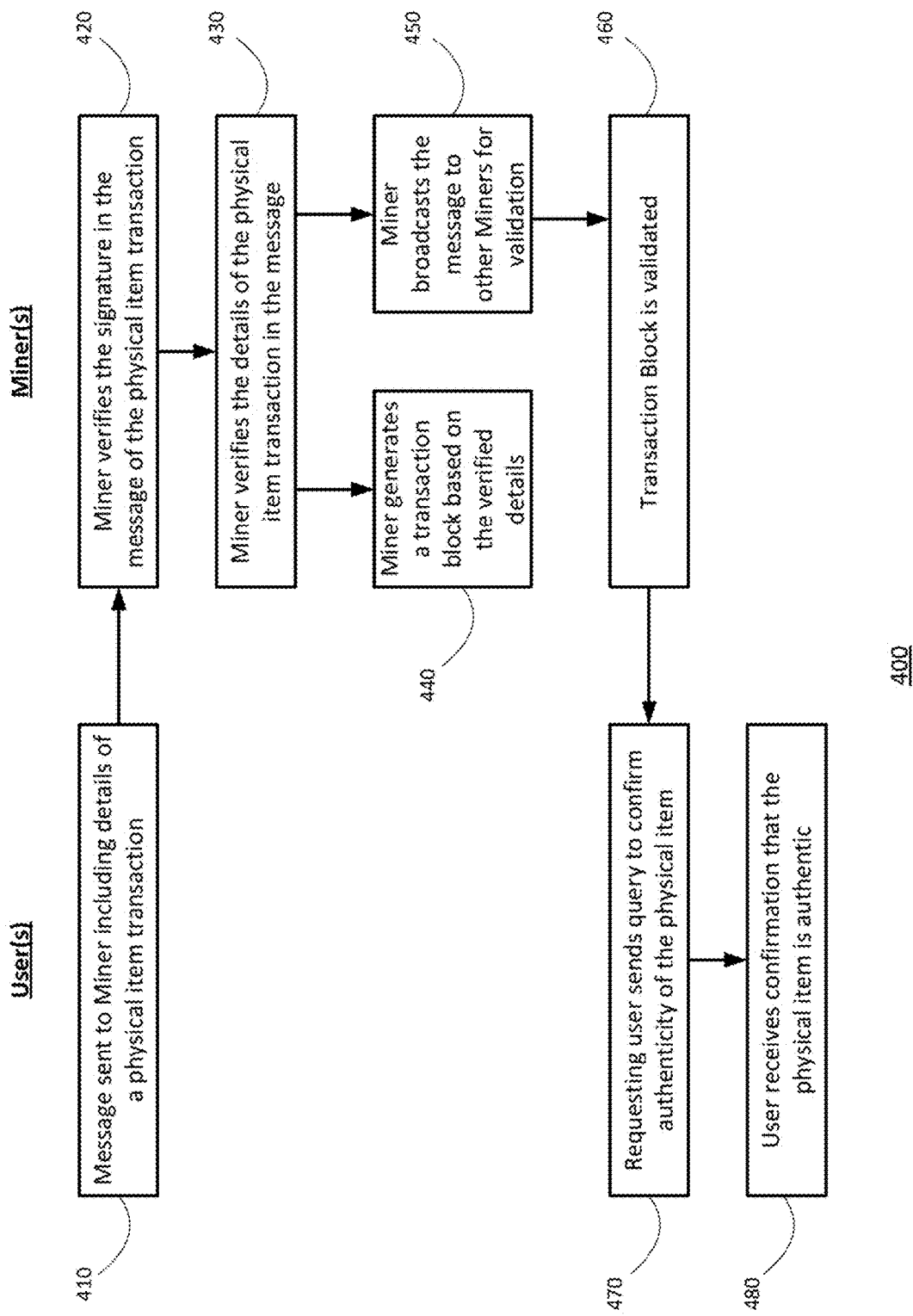
FIG. 4 is a flow diagram illustrating an example method according to aspects of the disclosure.

Each of the subsequent transactions 302, 303 may be recorded, coded, and decoded in a similar fashion. The transaction 302 from Owner 1 to Owner 2 may be recorded in a message including the item identifier 300 and the public key 132 of Owner 2, and signed using the private key 124 of Owner 1. In this manner, the hash 320 generated in this message may be different from the hash 310 generated in the first transaction, since the information included in the message is different. Thus, only the public key 122 of Owner 1 will properly decode the message such that the derived checksum confirms that the message has not been tampered with since being sent by Owner 1. Likewise, the transaction 303 from Owner 2 to Owner 3 may be recorded in a message including the item identifier 300 and the public key 142 of Owner 3, and signed using the private key 134 of Owner 2, so that it may be decoded using the public key 134 of Owner 2. FIG. 4 is a flow diagram illustrating an example method 400 for recording a transaction and authenticating details of the transaction in a digital ledger system. Some of the operations in the method may be carried out by transacting users of a digital ledger system, whereas some operations may be carried out by miners that create the digital ledger.

At block 410, a message is sent to a miner from a computing device of a user via the network. The message may include details of a transaction of a physical item. The details may include a unique identification corresponding to the specific physical item. The details may further include a public key or other identification of a buyer or other transacting party that is receiving the physical item. Other details may be included in the message, such as anyone or combination of a timestamp, a public key or other identification of the other transacting party, such as the seller. The message may further be cryptographically signed using a digital signature, or crypto-signature, of the transacting party possessing or owning the physical item before the transaction, or more generally, the party transferring the physical item to the other party in the transaction. In this regard, the message details may be encrypted in a hash or checksum using a cryptographic hashing algorithm, such that the message may be checked using a public key corresponding to the key used to sign the message.

At block 420, a miner may receive the message from the computing device of the user, and may verify that the message has not been altered or otherwise tampered since being sent from the user. For example, the miner may use public key cryptography to perform the verification, applying the public key of the signing user to the digital signature and comparing the derived checksum using a verification application. If the derived checksum is correct, then it can be assumed that the message was received from the purported owner who sent the message, and operations may proceed at block 430.

At block 430, the miner may confirm, using one or more processors, that the details of the transaction contained in the message are accurate. That is, even if the message is determined to have been safely received from a user, it must still be determined that the user is indeed the owner of the physical item described in the message. If the details of the transaction are in fact accurate, meaning the physical item is confirmed to be owned by the sender of the message, then operations may proceed to block 440.

At block 440, the miner generates, using one or more processors, a transaction block to be added to the digital ledger. The transaction block may include information from one or more verified messages received by the miner. For example, the information from the verified messages may include the verified details of the messages, such as one or more of the public key of the party receiving the physical item in the recorded transaction, the unique identifier of the physical item, the timestamp, and so on. The transaction block may be linked to a previous block of the digital ledger, such as by including a hash associated with the previous block of the digital ledger or in any other manner known in the relevant art, so that the transactions recorded are chronologically ordered and a chronological chain of ownership of the physical item may be established using the digital ledger.

At block 450, the message may be broadcast via the network from the miner to other miners of the system. In some examples, broadcasting the message may involve broadcasting the transaction block generated from the message for the transaction block to be stored in the other miners' copies of the digital ledger. Alternatively or additionally, the unverified message may be broadcast to the other miners for further verification. In this manner, the details of the transaction included in the message may be validated by consensus among the plurality of miners that receive and verify the details. This may result at block 460 with the transaction block being validated, such as by being fixed into place within the digital ledger so that conflicting transaction blocks, for instance blocks generated from a message containing a fraudulent transaction, are disregarded.

As is common with known digital ledger systems, each transaction block may be generated using a proof-of-work system, whereby no one miner may be capable of generating transaction blocks at a pace faster than the other miners combined. The respective proof-of-work for each block may be used to link the transaction blocks sequentially to one another in the digital ledger.

Turning back to the users of the system, at block 470, a requesting user, such as a new customer interested in purchasing the physical item, may send a query from the user's corresponding computing device to the digital ledger via the network in order to confirm authenticity of the physical item. Sending the query may involve scanning the scannable label that is affixed to the physical item, so that another physical item with a different label cannot be switched with the physical item. The identifier information from the label may then be provided to the database storing the digital ledger. In the case of a distributed system storing a digital ledger among several miners, the query may be a lookup routine such as those routines commonly used to search across peer-to-peer networks, or for looking up records for cryptocurrencies. The query may use a remote procedure call to query the data, such as by using gRPC based endpoints to query data stored at a given miner.

At block 480, the requesting user's query may be replied to by the system in the form of a confirmation message. The reply message may be transmitted from the database to the computing device of the user via the network. In the example of FIG. 4, the confirmation message may indicate that the physical item is authentic, meaning that the identifier associated with the label affixed to the physical item is contained within the database.

Furthermore, if the user's query includes an identification of a queried user, such as a purported owner of the physical item from which the requesting user wishes to purchase the physical item, then the database can further be used to confirm that the physical item is currently owned by the queried user. For example, the query may include a public key associated with the queried user. The database may then be used to lookup a public key of the queried user to confirm the ownership claim.

The above example describes a query that includes a public key in order to query publically accessible information. However, in other examples, some or all of the information in the database may be kept private, such that a private key is needed to send the query. In such an instance the query may be sent by the purported owner of the physical item, and may be cryptographically signed using the private key of the purported owner. Then, the system may include an application or program for decrypting the signature using a public key associated with the current owner of the physical item as recorded in the database. In this example, a successful decryption of the signature may indicate that the item is in fact owned by the purported owner, and all or some of the database records associated with the queried item may be returned in response. The data may be returned to the user that provided the query, or to a different user that prompted the query, such as a prospective customer that wishes to authenticate the item before purchasing, and whose information is included in the query provided from the purported owner.

The above example also describes a system that generally confirms whether or not an item is authentic. However, in other examples, the system may provide greater detail to the querying user. For example, if the querying user provides a public key of the purported owner and that public key is not currently linked to the corresponding identifier of the physical item, then the system may be configured to reply with a message indicating that the physical item is not owned by the purported owner. For further example, if the corresponding identifier of the physical item is not recorded in the digital ledger, then the system may be configured to reply with a message indicating that the physical item is not authentic, counterfeit, mislabeled, etc.

Figure 5:
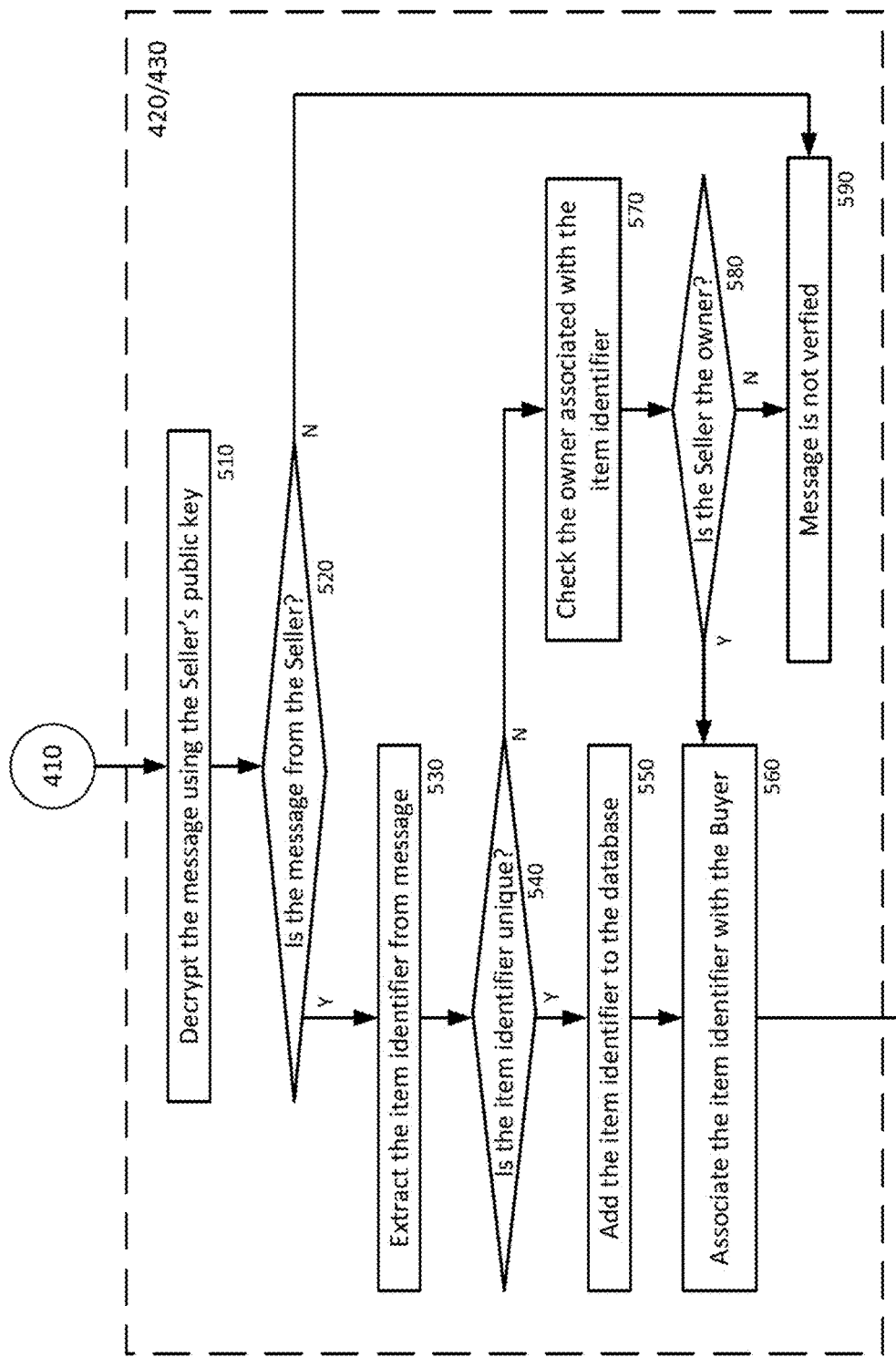
FIG. 5 is flow diagram illustrating aspects of the flow diagram of FIG. 4.

FIG. 5 is another flow diagram illustrating an example sub-routine for blocks 420 and 430 of FIG. 4, which are performed by the one or more processors associated with the miner. These blocks are performed by a miner verifying authenticity of a received message, and may involve one or more of the following operations. For purposes of clarity, the example of FIG. 5 assumes that the message includes details of a transaction of a physical item between a first user referred to as Seller and a second user referred to as Buyer.

At block 510, the received message is decrypted. Decrypting the message may involve decrypting a digital signature of the message that was signed using the private key of the Seller. In this regard, the decrypting may be performed using the public key of the Seller. If the messaged has not been tampered with or otherwise changed since transmission from the seller, than decryption of the digital signature with the corresponding public key would successfully verify the message.

At block 520, it may be determined whether the message is verified to have come from the Seller. If the message is not successfully verified, then operations may continue at block 590. Failed verification may involve sending a reply message to the user indicating that the message could not be verified. Otherwise, if the message is confirmed to have been sent by the Seller, then operations may continue at block 530.

At block 530, the identifier of the physical item may be extracted from the message. For example, the identifier may be included in the message, such as is shown in FIG. 2.

At block 540, it may be determined whether the identifier of the physical item is unique. For example, the miner may query the database via the network to determine whether the identifier included in the message appears in the digital ledger, whereby appearing in the digital ledger means that the identifier is not unique. The database may transmit a reply message via the network to the miner to indicate a determination of whether the identifier is unique.

If the identifier is determined to be unique, this may indicate that the physical item associated with the identifier has not yet been stored in the digital ledger. For example, the physical item may be a newly produced or manufactured item, or a transaction of the item has not previously occurred. In this sense, recording the current transaction may establish an original owner of the physical item. This "original owner" of the physical item may be the Buyer, that is, the user associated with a public key included in the message. At block 550, the identifier may be added to a transaction block in order to be included in the digital ledger. At block 560, the identifier may be associated with the digital key of the Buyer in the transaction block. Operations may continue at block 440 of FIG. 4, with the generated transaction block being added to the digital ledger. As noted in FIG. 4, continuing operations may further involve broadcasting the message or transaction block to other minors for further verification and validation.

Returning to block 540, if the identifier is determined to not be unique, this may indicate that the identifier has already been previously stored in the database, meaning that there is a preexisting or prior record of ownership in the database for the physical item in question. Operations may then proceed to block 570, with the database being queried by the miner via the network for the owner associated with the identifier. In some examples, the query may return a current owner of the physical item. In other examples, the query may return a reply message from the database to the miner via network, and the reply message may indicate complete or partially complete chain of ownership of the physical item based on a plurality of entries in the digital ledger. At block 580, the current owner of the physical item as indicated in the database may be compared by the one or more processors of the miner to the purported owner indicated by the message.

It is also possible that two different physical items may incorrectly receive the same identifier. In this case, the system will either quickly recognize the error when the second item is queried. For example, a manufacturer that labels two products with the same label may attempt to deliver both products to the same distributor. When the label of the first product is scanned, the digital ledger may be updated to indicate the distributor as the owner of the product associated with the identifier. Then, when the label of the second product is scanned, the system will indicate that the product had already been delivered to the distributor, which may signal the accident to the manufacturer before the second product ever leaves the manufacturer's possession. The second product may then be relabeled before being shipped, distributed, or sold. Similarly, a counterfeiter may recreate a label in order to trick a customer into thinking the item is authentic. But when the label is scanned, the queried information will confirm that the counterfeiter is not the recorded owner of the item with that label, thereby indicating that the label is a counterfeit.

If the information is a match, then operations may continue at block 560 with a transaction block associating the physical item with the Buyer being generated. As noted above, the Buyer may be associated with a public key included in the message, whereby the message is treated as the Seller's permission to include the Buyer as a next owner of the physical item in the chain of entries in the digital ledger. Alternatively, if the information at block 580 is not a match, then operations may continue at block 590 with the message not being properly verified. In this case, the Seller may not be the current owner of the physical item, and thus may not authorization to approve the transaction. In this case, the miner may not include the details of the transaction in the message in a transaction block, and the process ends.

The above examples generally describe transactions of ownership of a physical item. However, those skilled in the art will recognize that the principles of the present disclosure may be used to record other properties or features of physical items, such as possession of the physical item (e.g., borrowing and returning a physical item, renting or leasing a physical item). The system may further be modified to include details of the transactions, such as expiry dates (e.g., borrowing or renting an item for a fixed number of days, such that ownership of the item is assumed to revert to the "Seller" after that number of days), conditions (e.g., permission or prohibition of subleasing), or other metadata (e.g., a recommended price, an amount paid in previous transactions, etc.), so that information in the digital ledger may paint a more robust picture of the physical item and the transacting parties that have at one time or another transacted the item.

The systems and methods described in the above examples enable organizing records of physical items on an item-by-item basis. Furthermore, because many manufacturers already associate each individual item with a unique serial code, the only required action to integrate such items with the digital ledger system is to convert the unique serial code to a scannable label. The system may work with identifiers of any length or combination of characters or identifying symbols, including but not limited to a string of alphanumeric characters, a barcode, a two dimensional scannable array such as a QR code, or any combination thereof. Therefore, the system is backwards compatible with preexisting serial codes and other ID code schemes.

The system may be an open source application, and may be integrated with services and businesses in order record transactions as described above. The system may be used by numerous types of users, including users in both a supply chain as well as end users, across the globe, and across numerous industries. Furthermore, since the digital ledger may be a distributed ledger distributed across multiple peer nodes, using the system does not require a user to rely on a particular entity's network or storage system in order to build the digital ledger database.

As noted above, in one embodiment, the system may be queried using either public information (e.g., public key) or private information (e.g., private key). In this regard, the system may be configured to make records of physical items publically available for all to query (e.g., based on public keys) or private (e.g., queries based on private keys). Furthermore, the particular information that is made public or private can easily be toggled within the system, such that one user's information may be public while another's is made private, or basic information about a physical item (e.g., its current owner) may be made public while other metadata is made private. In the case of private data, a requesting user may contact the purported owner of the physical item in order to receive confirmation of the item's authenticity. For example, a customer at a shoe store may scan the label of a particular shoe, and the scan may trigger the original owner (e.g., manufacturer) of the shoe to forward confirmation of ownership of the shoe. This may involve the manufacturer querying the digital ledger using its private key, and returning a copy of the unique identifier and the recorded chain of ownership to the querying user. The user can then rely on this information to ensure that the shoe being purchased is authentic. At the same time, the private afforded by this method prevents the querying user or other users in the chain from knowing information about the manufacturer, such as the manufacturer's total inventory or overall sales data for a given manufacturer or supplier.

The above examples describe an identifier for a physical item being a scannable label affixed to the physical item. However, other examples may use other types of identifiers that can be queried and that are physically connected to the physical item. For example, an identifier may comprise a marking or visual indicator that is printed on, etched into, or otherwise formed by the item or material added to the item. Although in several of the above examples the identifier is a label, other identifiers such as an RFID chip may be used in addition to or instead of the label. More generally, any feature of the item, whether inherent to the physical item's physical structure or via an added assembly or marking, can be used if it provides a unique identifying characteristic for the physical item.

The above examples describe recording transactions of a physical item. However, other examples may be applied to a non-physical item, such as a digital file, provided that the item can be associated with a unique identifier, and provided that only a single copy of the item is made and that the item is copy-protected. The item may then include a code or digital label associated with the unique identifier which may be sent in a message from the computing device of the owner of the item, as described in the examples above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system comprising:
memory storing a digital ledger comprising a list of identifiers for a plurality of physical items, wherein each physical item corresponds to a different respective identifier, wherein each identifier is linked in the digital ledger to a public key of an owner of the corresponding physical item, and wherein the list of identifiers and linked public keys are distributed among a plurality of blocks sequentially connected to one another in the digital ledger; and
one or more processors configured to:
receive a message indicating a transaction of a physical item from a first user to a second user, wherein the message is cryptographically signed by a private key of the first user and includes information regarding the transaction and a cryptographic hash of the corresponding identifier of the physical item derived from scanning a label affixed to the physical item;
verify a cryptographic signature of the first user using a public key of the first user;
determine from the digital ledger whether or not the corresponding identifier of the physical item is included in the digital ledger;
in response to the corresponding identifier of the physical item not being included in the digital ledger, add the corresponding identifier of the physical item to the list of identifiers and assign an ownership of the physical item to the second user in the digital ledger;
in response to the corresponding identifier of the physical item being included in the digital ledger, determine whether the public key linked to the identifier included in the digital ledger matches the public key of the first user;
in response to the public key linked to the identifier in the digital ledger matching the public key of the first user, assign the ownership of the physical item to the second user in the digital ledger; and
in response to the public key linked to the identifier in the digital ledger not matching the public key of the first user, transmit a message indicating that the physical item is not authentic.

2. The system of claim 1, wherein the one or more processors are further configured to:
receive a query regarding a physical item, wherein the query includes:
the corresponding identifier of the physical item derived from scanning the label affixed to the physical item; and
a public key of a queried user; and
in response to the query:
determine from the digital ledger whether or not the queried user is owner of the physical item; and
transmit a confirmation whether or not the queried user is owner of the physical item.

3. The system of claim 1, wherein the information regarding the transaction includes a public key of the second user, and wherein to include the message in the digital ledger, the one or more processors are configured to link the corresponding identifier of the physical item to the public key of the second user.

4. The system of claim 1, wherein the information regarding the transaction further includes a timestamp indicating a time of the transaction.

5. The system of claim 1, wherein the digital ledger is stored among a plurality of peer nodes in a distributed network, and wherein to include the message in the digital ledger, the one or more processors are configured to broadcast the message to peer nodes of the distributed network.

6. The system of claim 1, wherein the label affixed to the physical item is a bar code.

7. The system of claim 1, wherein the memory and the one or more processors are communicatively coupled over a distributed computing network.

8. A method of authenticating and recording a transaction, comprising:
receiving, by one or more processors, a first message indicating a first transaction of a first physical item from a first user to a second user, wherein the first message is cryptographically signed by a private key of the first user and includes information regarding the first transaction and a cryptographic hash of an identifier corresponding to the first physical item, wherein the identifier is derived from querying an identifier physically connected to the first physical item;
verifying, by the one or more processors, a cryptographic signature of the first user using a public key of the first user;
determining, by the one or more processors, from a digital ledger, whether or not the identifier physically connected to the first physical item is included in the digital ledger, wherein the digital ledger comprises a list of identifiers for a plurality of physical items, each physical item corresponding to a different respective identifier, each identifier linked in the digital ledger to a public key of an owner of the corresponding physical item, the list of identifiers and linked public keys being distributed among a plurality of blocks sequentially connected to one another in the digital ledger;
in response to determining that the corresponding identifier of the first physical item is included in the digital ledger, determining, by the one or more processors, whether the public key linked to the identifier included in the digital ledger matches the public key of the first user;
in response to determining that the public key linked to the identifier in the digital ledger does not match the public key of the first user, transmitting a message indicating that the first physical item is not authentic;
receiving, by the one or more processors, a second message indicating a second transaction of a second physical item from a third user to a fourth user, wherein the second message is cryptographically signed by a private key of the third user and includes information regarding the second transaction and a cryptographic hash of an identifier corresponding to the second physical item, wherein the identifier is derived from querying an identifier physically connected to the second physical item;
verifying, by the one or more processors, a cryptographic signature of the third user using a public key of the third user;

determining, by the one or more processors, from a digital ledger, whether or not the identifier physically connected to the second physical item is included in the digital ledger;

in response to determining that the corresponding identifier of the second physical item is not included in the digital ledger, adding, by the one or more processors, the corresponding identifier of the second physical item to the list of identifiers;

assigning, by the one or more processors, an ownership of the second physical item to the fourth user in the digital ledger; and receiving, by the one or more processors, a third message indicating a third transaction of a third physical item from a fifth user to a sixth user, wherein the third message is cryptographically signed by a private key of the fifth user and includes information regarding the third transaction and a cryptographic hash of an identifier corresponding to the third physical item, wherein the identifier is derived from querying an identifier physically connected to the third physical item;

verifying, by the one or more processors, a cryptographic signature of the fifth user using a public key of the fifth user;

determining, by the one or more processors, from a digital ledger, whether or not the identifier physically connected to the third physical item is included in the digital ledger;

in response to determining that the corresponding identifier of the third physical item is included in the digital ledger, determining, by the one or more processors, whether the public key linked to the identifier included in the digital ledger matches the public key of the fifth user; and in response to the public key linked to the identifier in the digital ledger not matching the public key of the fifth user, transmitting, by the one or more processors, a message indicating that the third physical item is not authentic.

9. The method of claim 8, wherein the method further comprises, upon determining that the public key linked to the identifier in the digital ledger matches the public key of the first user, linking, by the one or more processors, the identifier corresponding to the physical item to a public key of the second user in the digital ledger.

10. The method of claim 9, wherein the information regarding the transaction includes a public key of the second user.

11. The method of claim 8, wherein the information regarding the transaction received in the message further includes a timestamp indicating a time of the transaction.

12. The method of claim 8, wherein the digital ledger is stored among a plurality of peer nodes in a distributed network, and wherein recording the transaction in the digital ledger comprises broadcasting, by the one or more processors, the message to peer nodes of the distributed network.

13. The method of claim 10, further comprising recording the transaction in the digital ledger, wherein receiving the message and recording the transaction in the digital ledger are performed among a plurality of processors over a distributed computing network.

* * * * *